United States Patent [19]

Juhász et al.

[11] 4,188,233

[45] Feb. 12, 1980

[54] PROCESS FOR PREPARING HYDRAULIC BINDING MATERIALS OF HIGH BONDING CAPACITY FROM GLASSY PYROGENIC ROCKS

[75] Inventors: Zoltán Juhász; Gyula Varju, both of Budapest, Hungary

[73] Assignee: Budapesti Muszaki Egyetem, Budapest, Hungary

[21] Appl. No.: 896,338

[22] Filed: Apr. 13, 1978

[30] Foreign Application Priority Data

Apr. 15, 1977 [HU] Hungary ............................ BU 848

[51] Int. Cl.$^2$ .................................................. C04B 7/02
[52] U.S. Cl. ..................................... 106/97; 106/100; 106/103; 106/118
[58] Field of Search ................. 106/103, 118, 120, 97, 106/100

[56] References Cited

U.S. PATENT DOCUMENTS

| 3,066,031 | 11/1962 | Schifferle | 106/118 |
| 3,488,203 | 1/1970 | Andersson | 106/118 |
| 3,852,084 | 12/1974 | Webster et al. | 106/118 |

*Primary Examiner*—James Poer
*Attorney, Agent, or Firm*—Young & Thompson

[57] ABSTRACT

There is disclosed a process for preparing hydraulic binding materials having a high bonding capacity, starting from glassy pyrogenic rocks. According to the invention glassy pyrogenic rocks are mechanically activated by grinding. The activation time is 0.5 to 36 hours, preferably 4 to 12 hours, and the mechanical stress applied is higher than in case of the conventional fine grinding. The activated product is thereafter admixed with one or both of lime and cement.

8 Claims, No Drawings

PROCESS FOR PREPARING HYDRAULIC BINDING MATERIALS OF HIGH BONDING CAPACITY FROM GLASSY PYROGENIC ROCKS

This invention relates to a process for the preparation of hydraulic binding materials having a high bonding capacity, starting from glassy pyrogenic rocks.

In the literature, hydraulic binding materials are prepared either by buring clay and lime at a temperature over 1300° C. and subsequent grinding (cements), or by grinding puzzolans together with lime hydrate or burnt lime [Talabér: *Handbook of cement industry*, Technical Publisher, Budapest (1966)].

Until now the use of pyrogenic glasses for the preparation of hydraulic binding materials has been strongly limited by their very low bonding capacity.

Now it has surprisingly been found that glassy pyrogenic rocks can be transformed into hydraulic binding materials with a bonding capacity similar to that of cement, without the conventional heat-treatments, simply by subjecting them to a mechanical activation, and admixing the product obtained with one or both of lime and cement.

According to the invention a pyrogenic glass containing more than 1% of combined water and optionally alkali metals are ground alone or in admixture with surface active agents for 0.5 to 36 hours, preferably 4 to 12 hours. During grinding a higher mechanical stress is applied than during usual fine grinding, and therefore also the molecular structure of the raw material overgoes a substantial change. The product obtained is thereafter admixed with one or both of lime and cement and, if desired, a colouring agent and other additives conventionally used in the preparation of hydraulic binding materials are added, either before or after the activation.

The decisive step of the process according to the invention is mechanical activation. The term "mechanical activation" is used herein to indicate a treatment by which the grain surface and atomic structure of solids become damaged due to absorption of mechanical energy. This damage results in a considerable increase in dislocation density, and consequently in an increased reactivity. The mechanical activation can therefore be characterized not only by the change in the grain size and specific surface of the raw material but also by its increased reactivity. Mechanical activation can be carried out by grinding or milling, since both of these methods are suitable for a concentrated transfer of energy.

Before performing the process according to the invention it is advisable to test how effectively the raw material can be activated. Since there is no unambiguous connection known in the art between the response of a raw material to mechanical activation and any of its easily measurable characteristics, its behaviour in this respect can be characterized only empirically. Those raw materials are considered to be suitable for activation for which it is true that the bonding capacity (standard strength after 28 days) of the unactivated raw material leaving at least 10% residue on a 86-micron screen is at least doubled as a result of 8 hours of activation carried out in a vibrating laboratory mill.

From the pyrogenic glassy rocks for instance pumicite, rhyolite glass-tuff, perlite, rock perlite as well as pumiceous stone and pumiceous sand can be successfully subjected to activation. For the purpose of this invention a pyrogenic glass is the more suitable the more water is bound in its chemical structure. Pyrogenic glasses containing more than 1% of combined water can already be used as raw materials; it is, however, more advantageous to start from materials which have a considerably higher combined water content.

Our experiments have led to the surprising result that the alkali metals built into the structure of the raw materials have absolutely no undesirable effect on the process according to the invention. This fact is really surprising in view of the literature references where the undesirable effect of the alkali metals on the quality of hydraulic binding materials has been widely discussed [Talabér: *Handbook of cement industry*, Technical Publisher (1966)].

For the purpose of this invention pyrogenic glasses having a relatively high dispersity grade already in natural state are especially suitable. One of their preferred representatives is pumicite having a grain size less than 100 microns in the amount of 80 to 90% related to the total weight of the rock. A special advantage of this material consists in its rigidity which conserably facilitates mechanical grinding and consequently activation.

If desired, the rock is dried prior to grinding in order to make the dry grinding possible.

Activation can be accomplished in every conventionally used grinding machine; it is preferred, however, to use a ball mill or vibratory mill. In addition to the raw material other additives, such as hardening accelerators, hardening inhibitors, plasticity modificators etc., can also be weighed into the mill. To improve grinding, surface active agents, preferably alkyl-polyoxyethylene-imidazoline or Plautol (lignin sulphonic acid-Na) can also be added. If a coloured hydraulic binding material is to be prepared, the colouring agent may be added to the raw material even prior to grinding.

The grinding time has a considerable influence on the activity of the product obtained. It has been found that the optimum activity can be ensured by grinding for 0.5 to 36 hours, preferably 4 to 12 hours. Longer grinding periods are not only unnecessary but would also cause a decrease in the activity of the product, since aggregation and agglomeration can take place.

The activated product can be admixed with one or both of lime and cement and optionally with further additives and colouring agents. The hydraulic binding materials prepared in this way possess an extremely good binding ability which, together with their other characteristics, is strongly dependent on the quality of the binding agent and its proportion to the other ingredients. Some preferred products prepared according to the invention are given hereinbelow.

When 70 parts by weight of an activated product are admixed with 30 parts by weight of lime hydrate, a hydraulic binding material similar to portland-cement 300 is obtained, the bonding capacity of which is at least the same as that of portland-cement 300. The composition of this product is similar to that of the lime-puzzolan but its bonding capacity is considerably higher.

According to another preferred embodiment of the process according to the invention 50 parts by weight of an activated product are admixed with 20 parts by weight of lime hydrate and 30 parts by weight of cement. The characteristics of the product obtained are very similar to those of portland-cement 400. A special advantage of this product consists in the favourable mutual relationship of its bending and compression strength.

According to a still further embodiment of the invention 17 parts by weight of an activated product are combined with 3 parts by weight of lime hydrate and 80 parts by weight of cement. The strength parameters of the product obtained are similar to those of portland-cement 400 and 500 at an equivalent water to cement ratio, and to those of pure portland-cement in the case of an equivalent composition.

The above compositions were given by way of illustration only without limiting the scope of products which can be prepared by the process of this invention.

The present invention also provides a suitable way to prepare coloured hydraulic binding materials for outer coverings of various buildings. The colouring agents are added to the pyrogenic glass before or after grinding. It should be noted that the colouring agents decrease the freezing resistance of the product as is known in the case of cements.

The process according to the invention has several important advantages. One of them is the low energy requirement which is due to the fact that mechanical activation requires considerably less energy than the conventional steps of burning and grinding of traditional cement production. Another advantage resides in the low cost of the equipment in which the process can be accomplished.

On the other hand, the process of the invention provides a suitable tool for the utilization of the natural glassy pyrogenic rocks which are readily available and easy to exploit. until now these rocks could only restrictedly be utilized for similar purposes.

The products obtained by the method of the invention have a very good sulphate stability and freezing resistance in addition to their high bonding capacity. With respect to freezing resistance especially the products containing first of all cement in addition to the activated pyrogenic glass proved to be advantageous.

Further details of the invention are illustrated by the following non-limiting Examples.

EXAMPLE 1

Into a 2-liter vibrating mill equipped with a grinding body having a diameter of at most 15 mm. and weighing 3 kg., 60 g. of air-dried pumicite are added. The pumicite is activated by grinding for 4 hours. Thereafter 70 parts by weight of activated pumicite and 30 parts by weight of lime hydrate are homogenized for half an hour in a mixer.

EXAMPLE 2

The procedure described in Example 1 is followed except that activation is continued for 16 hours.

From the binding materials prepared as set forth in either of Examples 1 or 2 specimens are prepared in the following way:

30 parts by weight of the dry binding material are admixed with 70 parts by weight of dry sand, and then water is added to the desired consistency. The specimens are kept in suitable molds for two days, thereafter following demolding—for 12 days in a room having a relative humidity of 90% and finally for 14 days under water. The density and compression stength of the specimens are tested on the 28th day. For comparison a portland-cement 500 (produced in Vác, Hungary) was used. The results obtained are listed in the following Table.

| Example | Activating time (hours) | Water/cement ratio | Density g./cm³ | Compression strength kp./cm² |
|---|---|---|---|---|
| 1 | 4 | 0.64 | 2.04 | 92 |
| 2 | 16 | 0.67 | 2.11 | 175 |
| cement | — | 0.58 | 2.12 | 181 |

EXAMPLE 3

Pumicite is activated as described in Example 1, in a vibrating mill, for 8.5 hours. To the raw material 0.1% of alkyl-polyoxyethylene-imidazoline is added prior to activation. 70 parts by weight of the activated pumicite obtained are then admixed with 30 parts by weight of lime hydrate in a ball mill, where stirring is continued for half an hour.

EXAMPLE 4

The procedure described in Example 3 is followed except that 70 parts by weight of the mixture consisting of pumicite and lime hydrate are admixed with 30 parts by weight of a cement (prepared in the cement factory of Lábatlan, Hungary).

EXAMPLE 5

The procedure described in Example 4 is followed except that 20 parts by weight of the pumicite-lime hydrate mixture according to Example 3 are admixed with 80 parts by weight of cement (produced in Lábatlan, Hungary). The characteristics of the binding materials prepared as set forth in Examples 3 to 5 are compared to the corresponding parameters of portland-cement 500 manufactured in the cement Factory of Lábatlan (L) and of portland-cement 500 from the cement factory of Vác (V).

The binding time has been determined according to the Hungarian Standard MSz 523 at a consistency corresponding to a sinking-value of 6 mm. The results obtained are listed in the following Table.

| Example | Water/cement ratio | Start | End |
|---|---|---|---|
|  |  | of the setting period |  |
| 3 | 0.460 | 13 h 35' | 25 h 35' |
| 4 | 0.392 | 5 h | 7 h 40' |
| 5 | 0.260 | 13 h | 1 h 30' |
| L | 0.268 | 3 h | 4 h 15' |
| V | 0.320 |  | 7 h |

The bending and compressive strengths of the specimens prepared from various mixtures containing the binding material according to the invention have been determined according to the Hungarian Standards MSz 523/4.3 and MSz 523/4.4. The following results have been obtained:

| Example | Bending strength kp./cm². | Compressive strength kp./cm². | Ratio of bending and compressive strength |
|---|---|---|---|
| 3 | 62 | 167 | 0.336 |
| 4 | 85 | 180 | 0.474 |
| 5 | 94 | 266 | 0.354 |
| L | 100 | 298 | 0.336 |
| V | 85 | 291 | 0.292 |

The flowing ability of the mortars prepared from the binding materials has been tested according to the Hungarian Standards MSz 523/4.5 and the constancy of volume was determined in agreement with Hungarian Standard MSz 523/5.1. The following results have been obtained:

| Example | Flow of the mortars (cm) | Specific weight of the cake (g./cm³.) | Water/cement ratio | Cons. of the cake, mm. |
| --- | --- | --- | --- | --- |
| 3 | 13.0 | 1.69 | 0.44 | 8 |
| 4 | 14.5 | 1.81 | 0.37 | 3 |
| 5 | 20.2 | 2.16 | 0.26 | 6 |
| L | 19.5 | 2.25 | 0.24 | 8 |
| V | 19.3 | 2.10 | 0.27 | 7 |

After a 28 days setting period no undesired change can be observed in the cakes prepared from the above mortars.

The freezing resistance of the specimens prepared by using the binding materials according to the invention has also been tested. In 25 periods, the specimens have been cooled to −20° C. for 6 hours and subsequently kept at +20° C. for additional 18 hours. No deformation could be observed on the surface of the specimens. The above tests supplied the following results:

| Example | Without freezing (kp./cm².) | With freezing (kp./cm².) | Remark |
| --- | --- | --- | --- |
| 3 | 178 | 187 | slight surface-freezing |
| 4 | 343 | 242 | no change on the surface |
| 5 | 363 | 382 | very nice surface |
| L | 421 | 295 | a small surface-damage |
| V | 309 | 307 | a small surface-damage |

EXAMPLE 6

150 g. of pumicite and 0.1% of Plastol (ligninsulfonic acid-Na) are added into a ball mill together with balls made of iron and weighing 6 kg. altogether, and the pumicite is activated by grinding for 8 hours. To 70 parts by weight of the activated product 30 parts by weight of lime hydrate are added and the mixture is homogenized in a ball mill.

EXAMPLE 7

The procedure described in Example 6 is followed except that activation is continued for 32 hours.

Specimens are prepared by admixing 30 parts by weight each of the binding materials prepared according to the Examples 6 and 7 with 70 parts by weight of sand, approximately at the same composition. After 28 days the density, compressive strength and Blaine-surface of the specimens have been determined. For comparison portland-cement 500/L, (prepared in Lábatlan) and Portland-cement 500/V, (manufactured in Vác) were used. The obtained results are listed in the following Table.

| Example | Activation time | Water/cement ratio | Density (g./cm³.) | Compressive strength (kp./cm².) | Specific surface (cm²./g.) |
| --- | --- | --- | --- | --- | --- |
| 6 | 8 | 0.635 | 2.11 | 250 | 16205 |
| 7 | 32 | 0.656 | 2.13 | 264 | 17170 |
| L |   | 0.556 | 2.21 | 334 | — |
| V |   | 0.585 | 2.15 | 237 | — |

EXAMPLE 8

Pumicite is activated in admixture with 0.1% of alkyl-polyoxyethylene-imidazoline for 8.5 hours, in a vibrating mill. The activated pumicite is homogenized in a ball mill and admixed with 15% of lime hydrate. To 20 parts by weight of the mixture obtained 80 parts by weight of portland-cement 500 (produced in Lábatlan, Hungary) are added, and homogenization is repeated.

EXAMPLE 9

The procedure described in Example 8 is followed except that 50 parts by weight of the activated pumicite/lime hydrate mixture are admixed with 50 parts by weight of cement.

EXAMPLE 10

The procedure described in Example 8 is followed with the only difference that 70 parts by weight of the activated pumicite/lime hydrate mixture are admixed with 30 parts by weight of cement.

The setting time, density,, and compressive strength of the binding materials prepared according to Examples 8 to 10 have been determined in comparison with the corresponding parameters of portland-cement 500 from Lábatlan and with a mixture of activated pumicite with 15% lime hydrate. The setting time has been determined on specimens wetted to the same composition. For the purpose of the remaining two tests specimens have been prepared from 30 parts by weight of binding material and 70 parts by weight of sand. Density and compressive strength of the specimens were measured on the 28th day. The following results have been obtained:

| Example | Cement (%) | Pumicite + lime (%) | Water/cement ratio | Setting time (hours) | Density (g./cm³.) | Compressive strength (kp./cm².) |
| --- | --- | --- | --- | --- | --- | --- |
| 8 | 80 | 20 | 0.28 | 3.33 | 2.15 | 350 |
| 9 | 50 | 50 | 0.35 | 5.25 | 2.09 | 285 |
| 10 | 30 | 70 | 0.43 | 7.75 | 2.07 | 250 |
| Cement | 100 | 0 | 0.50 | 20 | 1.98 | 107 |
| Activated pumicite with lime hydrate | 0 | 100 | 0.25 | 1.75 | 2.27 | 277 |

EXAMPLE 11

To pre-ground pumicite 20% by weight of oxide-yellow and 0.1% by weight of Plastol are added and the mixture is activated for 8.5 hours in a vibrating mill. 70 parts by weight of the activated product obtained are admixed with 30 parts by weight of lime hydrate, and 20% by weight of a portland-cement 500 from Lábatlan are added. The mixture is then homogenized.

EXAMPLE 12

The procedure described in Example 11 is followed except that oxide-green is substituted for the oxide-yellow. Specimens are prepared from 30 parts by weight each of the binding materials prepared in Examples 11 and 12 and 70 parts by weight of sand. The specimens are steamed at 87° C. for 8 hours and kept under water for 2 days.

The strength of the specimens after corrosion, freezing and storage in water are determined.

The corrosion tests are carried out by dipping the specimen up to half of its volume into a 5% $MgSO_4$ solution and saturating the solution and the space over the specimens with $CO_2$. The treatment is continued for 28 hours.

The freezing test is accomplished in 25 periods by freezing at $-20°$ C. for 6 hours and melting out at $+20°$ C. in water for 18 hours.

For comparison specimens prepared from 80% of portland-cement manufactured in Lábatlan and 20% of binding material are used. These specimens are also dipped into water to half of their volume and kept in this position for 28 days.

The results obtained are listed in the following table.

| Example | Colouring agent | Strength after corrosion | Comp. strengths (kp./cm$^2$.) after freezing | after storage in water |
|---|---|---|---|---|
| 11 | oxide yellow | 120 | 31 | 128 |
| 12 | oxide green | 144 | 42 | 141 |
| cement | oxide yellow | 248 | 112 | 160 |
| cement | oxide green | 190 | 95 | 122 |

What we claim is:

1. A process for preparing hydraulic binding materials having a high bonding capacity, comprising grinding a natural pyrogenic glass containing more than 1% of combined water, for 0.5 to 36 hours, under a higher mechanical stress than is usual during conventional fine grinding, and thereafter admixing the glass with a member selected from the group consisting of lime and portand cement.

2. A process as claimed in claim 1, in which said grinding is effected for about 4 to 12 hours.

3. A process as claimed in claim 1, in which said grinding is effected in admixture with a surfactant.

4. A process as claimed in claim 1, in which said natural pyrogenic glass is pumicite.

5. A process as claimed in claim 1, in which about 70 parts by weight of the ground glass are admixed with about 30 parts by weight of lime hydrate.

6. A process as claimed in claim 1, in which said ground glass is mixed both with lime hydrate and with cement.

7. A process as claimed in claim 6, in which about 50 parts by weight of said ground glass are admixed with about 20 parts by weight of lime hydrate and about 30 parts by weight of cement.

8. A process as claimed in claim 6, in which about 17 parts by weight of said ground glass are admixed with about 3 parts by weight of lime hydrate and about 80 parts by weight of cement.

* * * * *